(12) United States Patent
Miura et al.

(10) Patent No.: US 6,981,121 B2
(45) Date of Patent: Dec. 27, 2005

(54) METHOD FOR ALIGNING STORED DATA

(75) Inventors: Takashi Miura, Kawasaki (JP); Iwao Yamazaki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 288 days.

(21) Appl. No.: 10/350,115

(22) Filed: Jan. 24, 2003

(65) Prior Publication Data

US 2004/0003197 A1    Jan. 1, 2004

(30) Foreign Application Priority Data

Jun. 28, 2002    (JP) .............................. 2002-191443

(51) Int. Cl.[7] ............................................. G06F 12/00

(52) U.S. Cl. ...................... 711/201; 711/118

(58) Field of Search ................ 711/201, 118

(56) References Cited

U.S. PATENT DOCUMENTS

| 5,907,865 A | 5/1999 | Moyer |
| 2004/0003174 A1 * | 1/2004 | Yamazaki ................... 711/118 |

FOREIGN PATENT DOCUMENTS

| JP | A-10-312281 | 11/1998 |
| JP | A-2000-82009 | 3/2000 |

* cited by examiner

Primary Examiner—Reginald G. Bragdon
(74) Attorney, Agent, or Firm—Staas & Halsey LLP

(57) ABSTRACT

An arithmetic unit performs an arithmetic operation, and outputs data obtained as a result of the arithmetic operation. The data output from the arithmetic unit is stored in a store buffer. The data read from the store buffer is stored in cache memory. A first alignment circuit allows an alignment circuit to realign the data output from the arithmetic unit and stored in the store buffer, and the second alignment circuit realigns data read from the store buffer and stored in the cache memory.

11 Claims, 10 Drawing Sheets

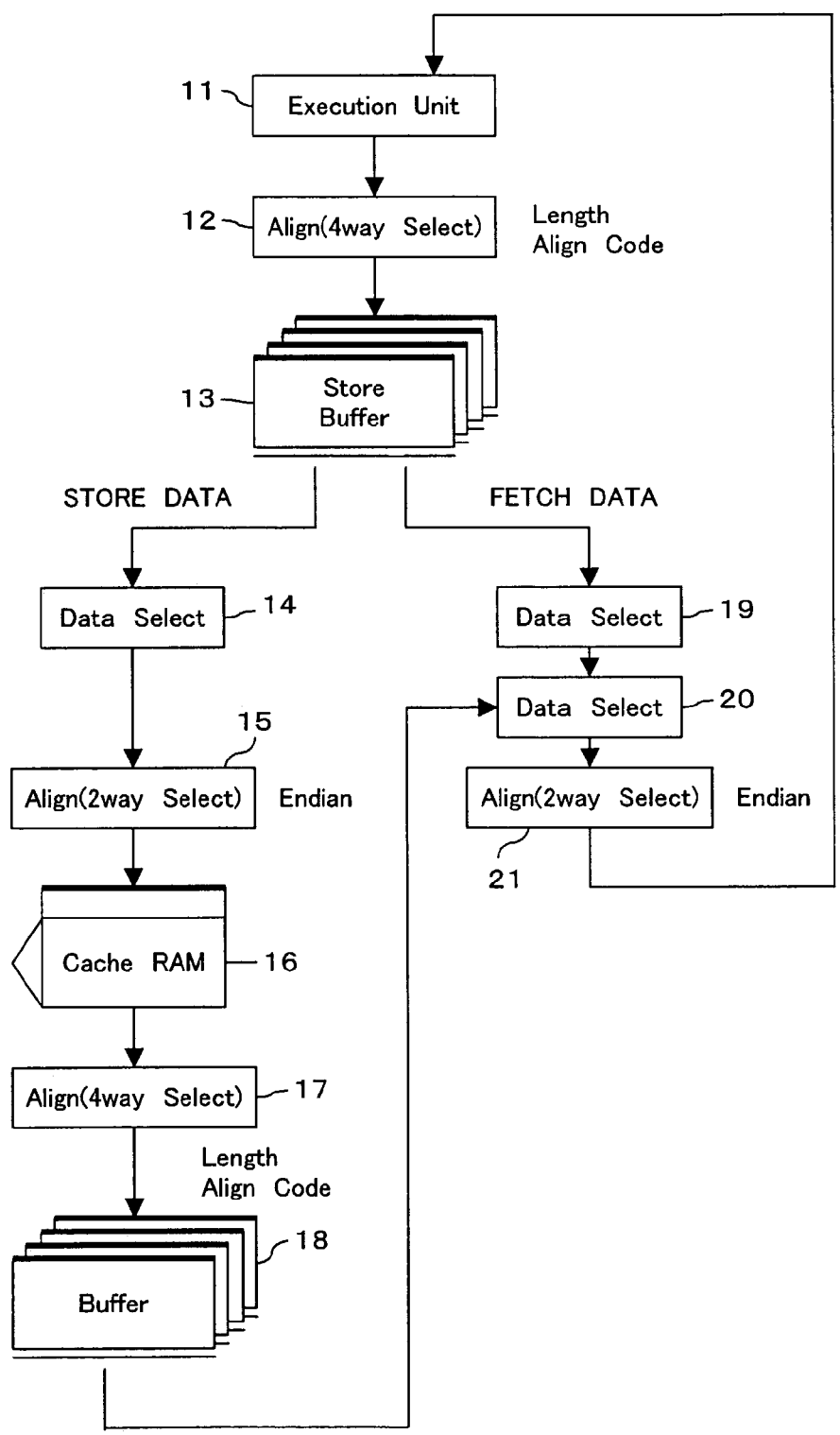
F I G. 2

STORE DATA

STORE BUFFER

EFFCTIVE DATA LENGTH

STORE DATA(1BYTE)

STORE DATA(2BYTE)

STORE DATA(4BYTE)

STORE DATA(8BYTE)

F I G. 5A
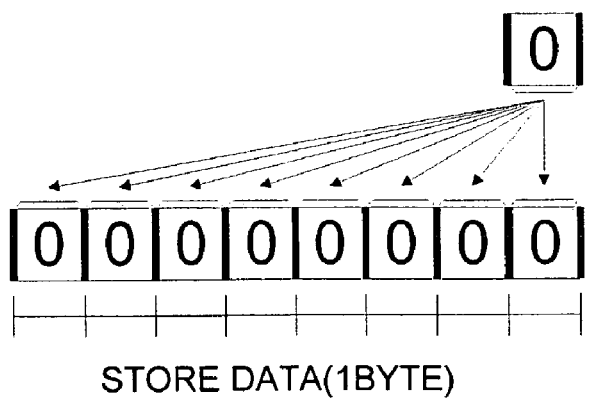
STORE DATA(1BYTE)
F I G. 5B
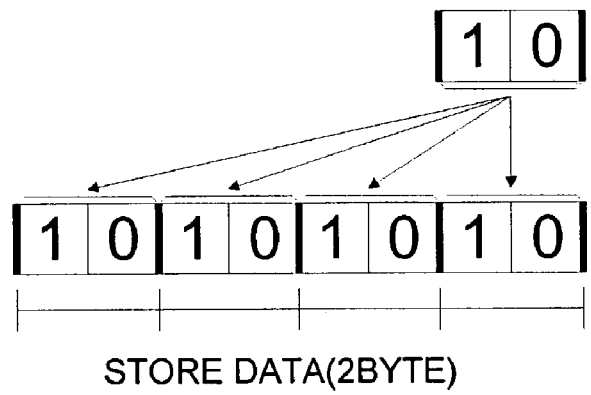
STORE DATA(2BYTE)
F I G. 5C
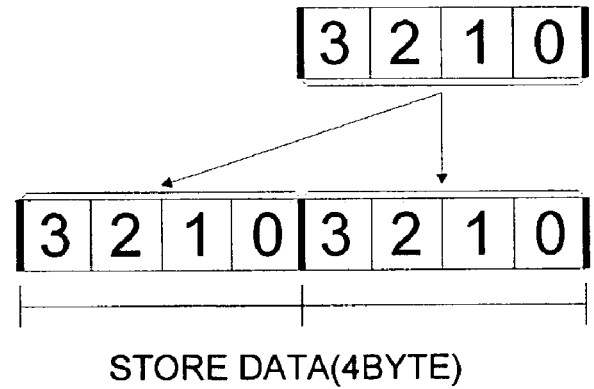
STORE DATA(4BYTE)
F I G. 5D
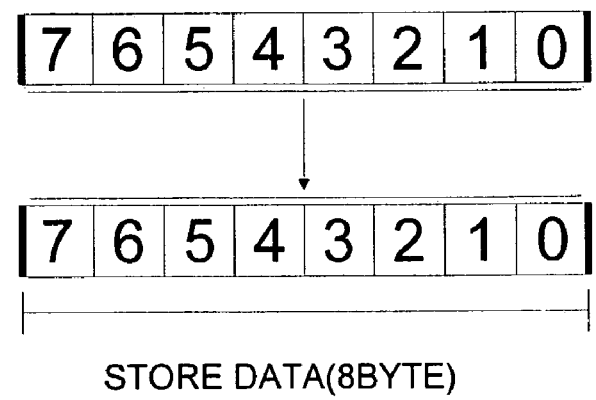
STORE DATA(8BYTE)

STORE DATA

4WAY SELECT

STORE BUFFER

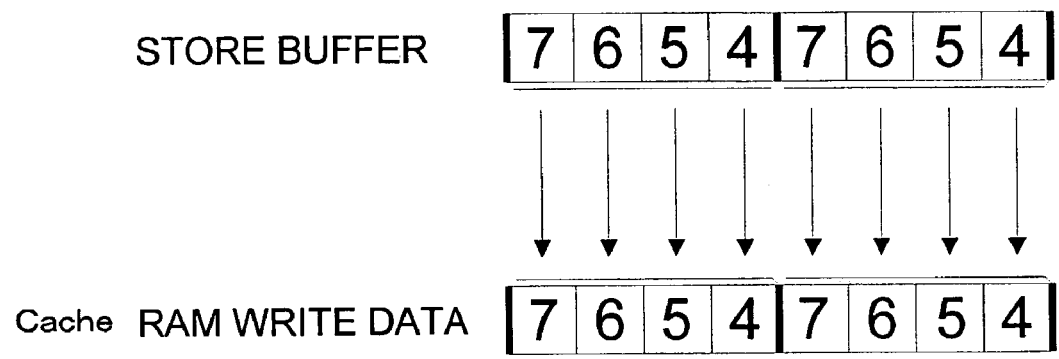
F I G. 7A
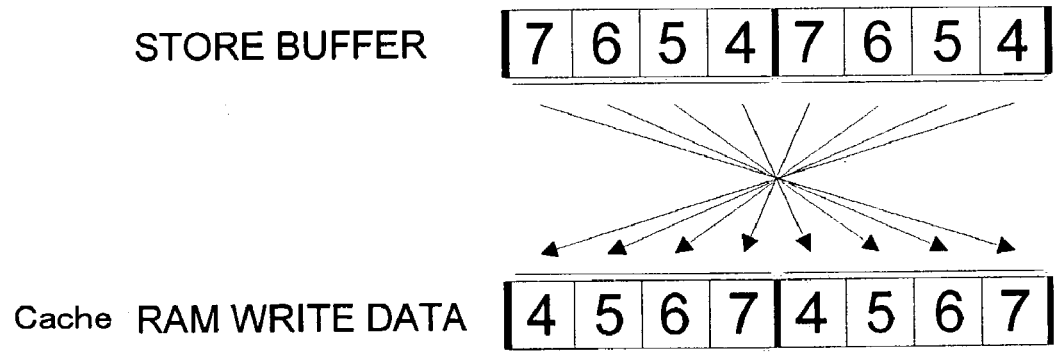
F I G. 7B

FIG. 8A
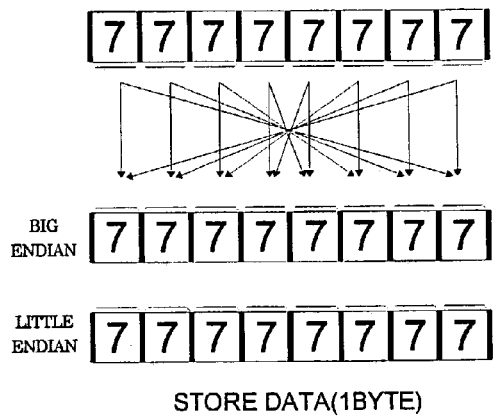
STORE DATA(1BYTE)
FIG. 8B
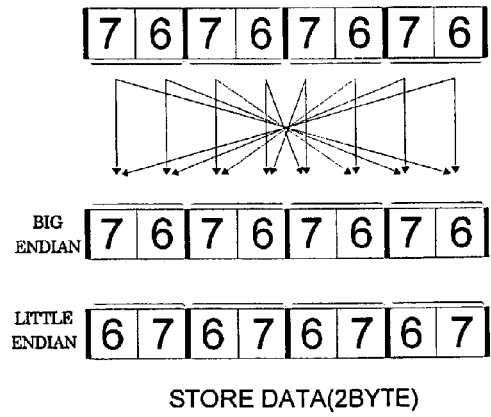
STORE DATA(2BYTE)
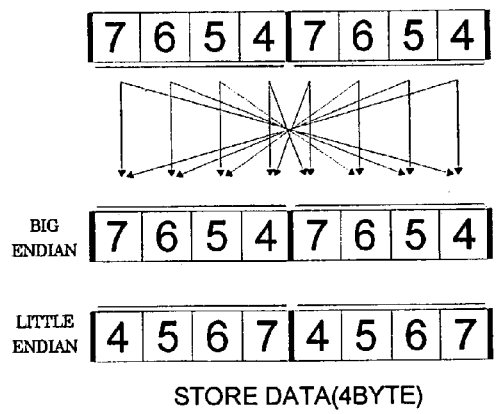
STORE DATA(4BYTE)
FIG. 8C
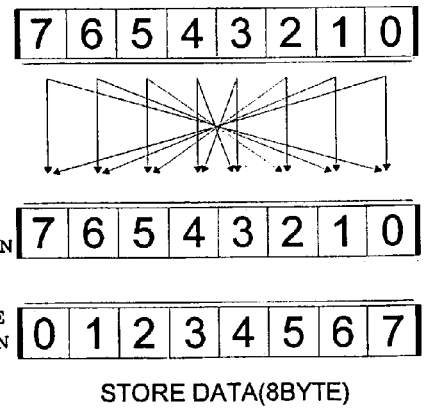
STORE DATA(8BYTE)
FIG. 8D FIG. 9A
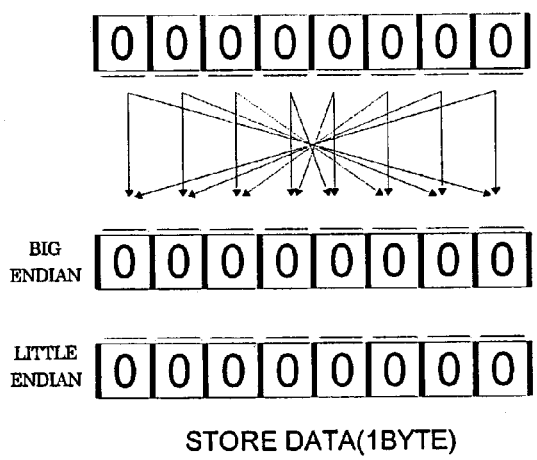
STORE DATA(1BYTE)
FIG. 9B
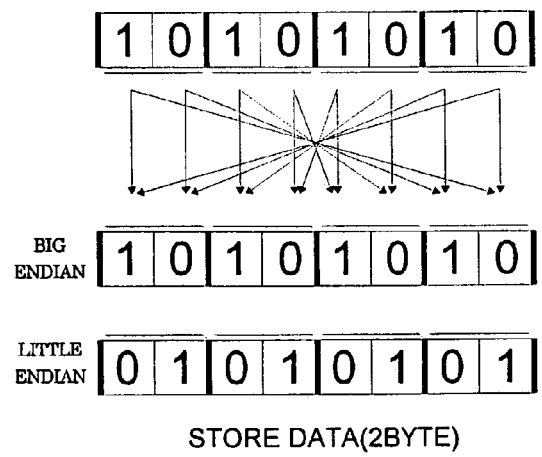
STORE DATA(2BYTE)
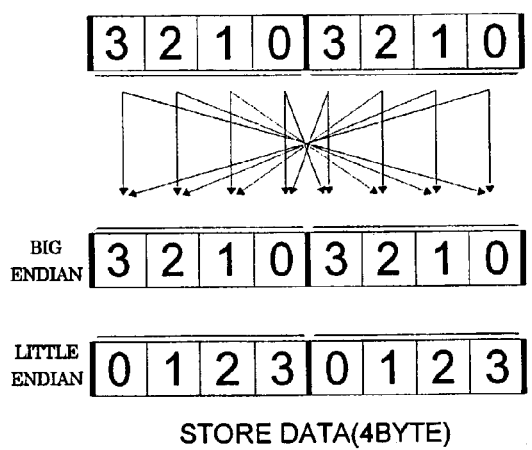
STORE DATA(4BYTE)
FIG. 9C
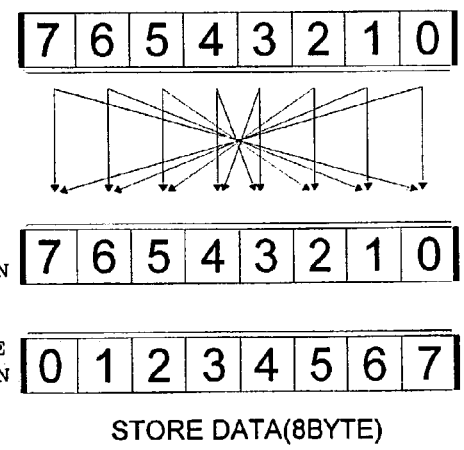
STORE DATA(8BYTE)
FIG. 9D

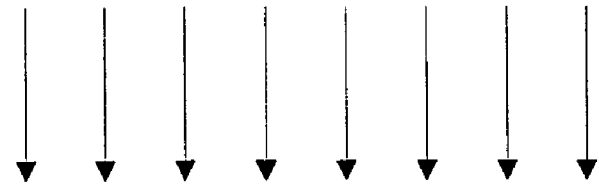
F I G. 1 0 A
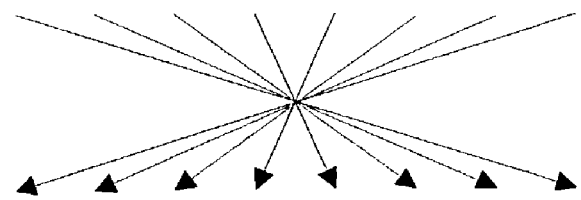
F I G. 1 0 B

METHOD FOR ALIGNING STORED DATA

BACKGROUND OF THE INVENTION

1. Field of the Invention

The present invention relates to the technology for use with a data processing device, and more specifically to the technology of storing data in a storage unit for temporarily holding data.

2. Description of the Related Art

There have been orders of storing data in a storage unit of a data processing device, that is, a big ending form and a little ending form. A "big ending" means that the high-order value is stored at the lowest address in the storage area. For example, when the hexadecimal numbers "12345678" are to be stored in memory in the big ending form, the values "12", "34", "56", and "78" are stored in order from the lowest address. On the other hand, in the little ending form, the low-order value is stored at the lowest address in the storage area. That is, in the above-mentioned example, the values "78", "56", "34", and "12" are stored in order from the lowest address.

Some of the currently marketed data processing devices support both of the above-mentioned endians in accessing the internal cache memory. With the data processing device, the memory is accessed in the little endian form, for example, in the following cases.

1. When memory access is set in the little endian form in the register in which the operation state of a processor is set.
2. When an instruction to access memory in the little endian form is described in a program executed in the data processing device.
3. When an instruction to access memory in the big endian form is issued in 1 and 2 above, and when switching the endian is specified in the address conversion buffer (also referred to as a TLB (translation lookaside buffer)) prepared for management of an address of cache memory.

Since the case 3 above is to be considered, it is not determined until a retrieval result for the TLB is obtained as to which endian is to be adopted in aligning data when data is stored in the cache memory.

On the other hand, the data to be stored (store data) in the cache memory is issued immediately after the completion of the arithmetic process in the arithmetic unit. However, normally the store data is temporarily stored in the store buffer memory before being stored in the buffer memory. Since the store data is stored in the store buffer memory regardless of the retrieval in the TLB, the data processing device which supports both of the endians cannot normally select an endian for storage in the store buffer memory.

Described below is the configuration shown in FIG. 1. FIG. 1 shows the configuration of the conventional data processing device. In FIG. 1, the device includes: an arithmetic unit 101; a store buffer 102; data selectors 103, 107, and 108; alignment circuits 104 and 109; cache memory 105; and a buffer 106. The data processing device shown in FIG. 1 supports both endians described above in accessing the cache memory 105.

When a request to store data is issued, the data obtained as a result of the arithmetic process performed by the arithmetic unit 101 is first stored directly in the store buffer 102. The data stored in the store buffer 102 is selected and read by the data selector 103, and then stored in the cache memory 105. The cache memory 105 is provided in the data processing device, and is larger in storage capacity than the store buffer 102. When the data read from the store buffer 102 is stored in the cache memory 105, the alignment circuit 104 realigns the data.

The alignment circuit 104 realigns the stored data in byte unit based on the store length indicating the word length of data stored in the cache memory 105, the alignment code indicating the right adjust or left adjust of the location of the data in the storage area when the data is stored in the cache memory 105, and the above-mentioned endian. Assuming that the word length of the data in the data processing device is 8 bytes, it is necessary for the alignment circuit 104 to have a circuit configuration such that 8-way data can be selected for each byte can be selected, that is, the data can be selected from a total of 8 bytes formed by the 0-th through 7-th bytes input into the alignment circuit 104 as the data of each of the 0-th through 7-th bytes output from the alignment circuit 104.

When the data stored in the cache memory 105 is fetched at a fetch request issued after a request to store data, the data stored in the cache memory 105 is read and temporarily stored in the buffer 106, the stored data is selected and read by the data selector 108, and the data is realigned by the alignment circuit 109 as by the alignment circuit 104 in a byte unit, and is then input into the arithmetic unit 101. At this time, if the data to be processed at the fetch request has not been stored in the cache memory 105, the target data is selected by the data selector 107 and read from the store buffer 102, and input into the arithmetic unit 101 through the data selector 108 and the alignment circuit 109.

As described above, with the configuration shown in FIG. 1, the stored data is realigned by the alignment circuit 104 provided immediately before the cache memory 105 in the endian order. With this configuration, the stored data can be realigned after obtaining the retrieval result from the TLB.

Conventionally, as described above, the data stored in the cache memory 105 has been collectively aligned immediately before storing the data by the alignment circuit 104 directly connected to the cache memory 105. Therefore, the alignment circuit 104 is complicated in circuit configuration, and the circuit is very large. On the other hand, the requirement for the delay time allowed when data is written to the cache memory 105, and the requirement for the variations in delay time among simultaneously written data to the cache memory 105 are normally strict. However, these requirements are directed toward the alignment circuit 104 directly connected to the cache memory 105.

SUMMARY OF THE INVENTION

To solve the above-mentioned problems, the present invention aims at simplifying the configuration of the alignment circuit provided in the stage prior to the cache memory.

The data processing device according to an aspect of the present invention includes: an arithmetic unit for performing an arithmetic operation at an instruction and outputting data obtained as a result of the arithmetic operation; a first storage unit storing data output from the arithmetic unit; a second storage unit for functioning as cache memory storing the data read from the first storage unit; a first data alignment unit for realigning data output from the arithmetic unit and stored in the first storage unit; and a second data alignment unit for realigning the data read by the first storage unit and stored in the second storage unit.

With the above-mentioned configuration, the first data alignment unit and the second data alignment unit can share a data realigning process, thereby reducing the amount of work for realigning data to be performed by the second data alignment unit provided in the stage prior to the second storage unit, simplifying the configuration, and easily satisfying the request by the cache memory relating to the transmission delay of the data.

In the above-mentioned data processing device according to the present invention, the second data alignment unit can be configured such that data can be realigned according to the information about the instruction specifying an endian when the data is stored in the second storage unit.

With the above-mentioned configuration, since data is realigned according to the information about the instruction specifying an endian by the second data alignment unit not by the first data alignment unit, the data can be realigned after obtaining a retrieval result from an address conversion buffer.

Furthermore, in the above-mentioned data processing device according to the present invention, the first data alignment unit can be configured such that the data can be realigned according to the word length information about the word length of the data when the data is stored in the first storage unit, and the location information about the position of the data in the storage area in the first storage unit in which the data is located when it is stored in the first storage unit.

With the above-mentioned configuration, since the data can be realigned according to the word length information and the position information not by the second data alignment unit provided in the stage prior to the second storage unit functioning as cache memory, the amount of work to be performed by the second data alignment unit can be reduced, thereby simplifying the configuration.

With the above-mentioned configuration, the second data alignment unit can be configured such that data can be realigned according to the information about the instruction specifying an endian when the data is stored in the second storage unit, and the first data alignment unit can be configured such that the above-mentioned data can be copied and located in the position where the above-mentioned original data is not located in the storage area.

With the above-mentioned configuration, since data can be realigned such that the relationship between the data before and after the realignment by the second data alignment unit can indicate symmetry, the second data alignment unit can be realized in the circuit showing the symmetry, and, as a result, the requirement by the cache memory for the variation in transmission delay between data can be easily satisfied.

Furthermore, the above-mentioned data processing device according to the present invention can further include: a third storage unit storing data read from the second storage unit; a third data alignment unit for realigning data read from the second storage unit and stored in the third storage unit; and a fourth data alignment unit for realigning data read from the third storage unit to use the data in an arithmetic operation performed by the arithmetic unit.

At this time, the fourth data alignment unit can realign the data according to the information about the instruction specifying an endian when the data is stored in the second storage unit. Then, the third data alignment unit can realign the data according to the word length information about the word length of the data when the data is stored in the first storage unit, and the location information about the position of the data in the storage area in the first storage unit in which the data is located when it is stored in the first storage unit.

With the configuration, since the third data alignment unit and the fourth data alignment unit share a data realigning operation, the amount of work to be performed by the fourth data alignment unit for realigning data read from the third storage unit as an arithmetic target of the arithmetic unit, thereby simplifying the configuration and reducing the transmission delay of data from the third storage unit to the arithmetic unit.

Furthermore, with the configuration, the fourth data alignment unit can also be configured such that data read from the arithmetic unit can be realigned as an arithmetic target of the arithmetic unit.

With the configuration, data read from the third storage unit as an arithmetic target of the arithmetic unit can be realigned, and data read from the first storage unit as an arithmetic target of the arithmetic unit can be realigned by the fourth data alignment unit, thereby scaling down the circuit of the entire data processing device.

Furthermore, the method for aligning stored data, which is another aspect of the present invention, solves the above-mentioned problem by: realigning data output as a result of the arithmetic from the arithmetic unit, provided in the data processing device, for performing an arithmetic at an instruction, and stored in the first storage unit; and realigning the data read from the first storage unit, and stored in the second storage unit functioning as cache memory in the data processing device.

Thus, the data realigning operation is shared, and the amount of work for realigning the data stored in the second storage unit functioning as the cache memory can be reduced, thereby simplifying the circuit configuration for the data realignment and easily satisfying the requirement by the cache memory for the transmission delay of data.

In the above-mentioned method for aligning stored data according to the present invention, when data stored in the second storage unit is realigned, it is realigned according to the information about the inspection specifying an endian when the data is stored in the second storage unit. When data stored in the first storage unit is realigned, the data is realigned according to the word length information about the word length of the data when the data is stored in the first storage unit, and the location information about the position of the data in the storage area in the first storage unit in which the data is located when it is stored in the first storage unit, and the data can be copied to the position in which the original data is not located in the storage area according to the word length information and the location information.

Thus, since the relationship between data before and after the realignment of the data stored in the second storage unit can indicate symmetry, the circuit configuration for realigning the data can indicate symmetry, thereby easily satisfying the requirement by the cache memory for variations in transmission delay between the data.

BRIEF DESCRIPTION OF THE DRAWINGS

The present invention will be more apparent from the following detailed description when the accompanying drawings are referenced.

FIG. 2 shows the configuration of the data processing device embodying the present invention;

FIG. 5A shows the process of realigning data performed by the alignment circuit 12 when an alignment code is right-adjusted and store data is 1 byte;

FIG. 5B shows the process of realigning data performed by the alignment circuit 12 when an alignment code is right-adjusted and store data is 2 bytes;

FIG. 5C shows the process of realigning data performed by the alignment circuit 12 when an alignment code is right-adjusted and store data is 4 bytes;

FIG. 5D shows the process of realigning data performed by the alignment circuit 12 when an alignment code is right-adjusted and store data is 8 bytes;

FIG. 7A shows the realignment of data performed by an alignment circuit 15 when an instruction of an endian is a big endian;

FIG. 7B shows the realignment of data performed by an alignment circuit 15 when an instruction of an endian is a little endian;

FIG. 8A shows the process of realigning data, which has been realigned by the alignment circuit 12, performed by the alignment circuit 15 when an alignment code is left-adjusted and store data is 1 byte;

FIG. 8B shows the process of realigning data, which has been realigned by the alignment circuit 12, performed by the alignment circuit 15 when an alignment code is left-adjusted and store data is 2 bytes;

FIG. 8C shows the process of realigning data, which has been realigned by the alignment circuit 12, performed by the alignment circuit 15 when an alignment code is left-adjusted and store data is 4 bytes;

FIG. 8D shows the process of realigning data, which has been realigned by the alignment circuit 12, performed by the alignment circuit 15 when an alignment code is left-adjusted and store data is 8 bytes;

FIG. 9A shows the process of realigning data, which has been realigned by the alignment circuit 12, performed by the alignment circuit 15 when an alignment code is right-adjusted and store data is 1 byte;

FIG. 9B shows the process of realigning data, which has been realigned by the alignment circuit 12, performed by the alignment circuit 15 when an alignment code is right-adjusted and store data is 2 bytes;

FIG. 9C shows the process of realigning data, which has been realigned by the alignment circuit 12, performed by the alignment circuit 15 when an alignment code is right-adjusted and store data is 4 bytes;

FIG. 9D shows the process of realigning data, which has been realigned by the alignment circuit 12, performed by the alignment circuit 15 when an alignment code is right-adjusted and store data is 8 bytes;

FIG. 10A shows the realignment of data performed by an alignment circuit 21 when an instruction of an endian is a big endian;

FIG. 10B shows the realignment of data performed by an alignment circuit 21 when an instruction of an endian is a little endian;

DESCRIPTION OF THE PREFERRED EMBODIMENTS

Figure 1:
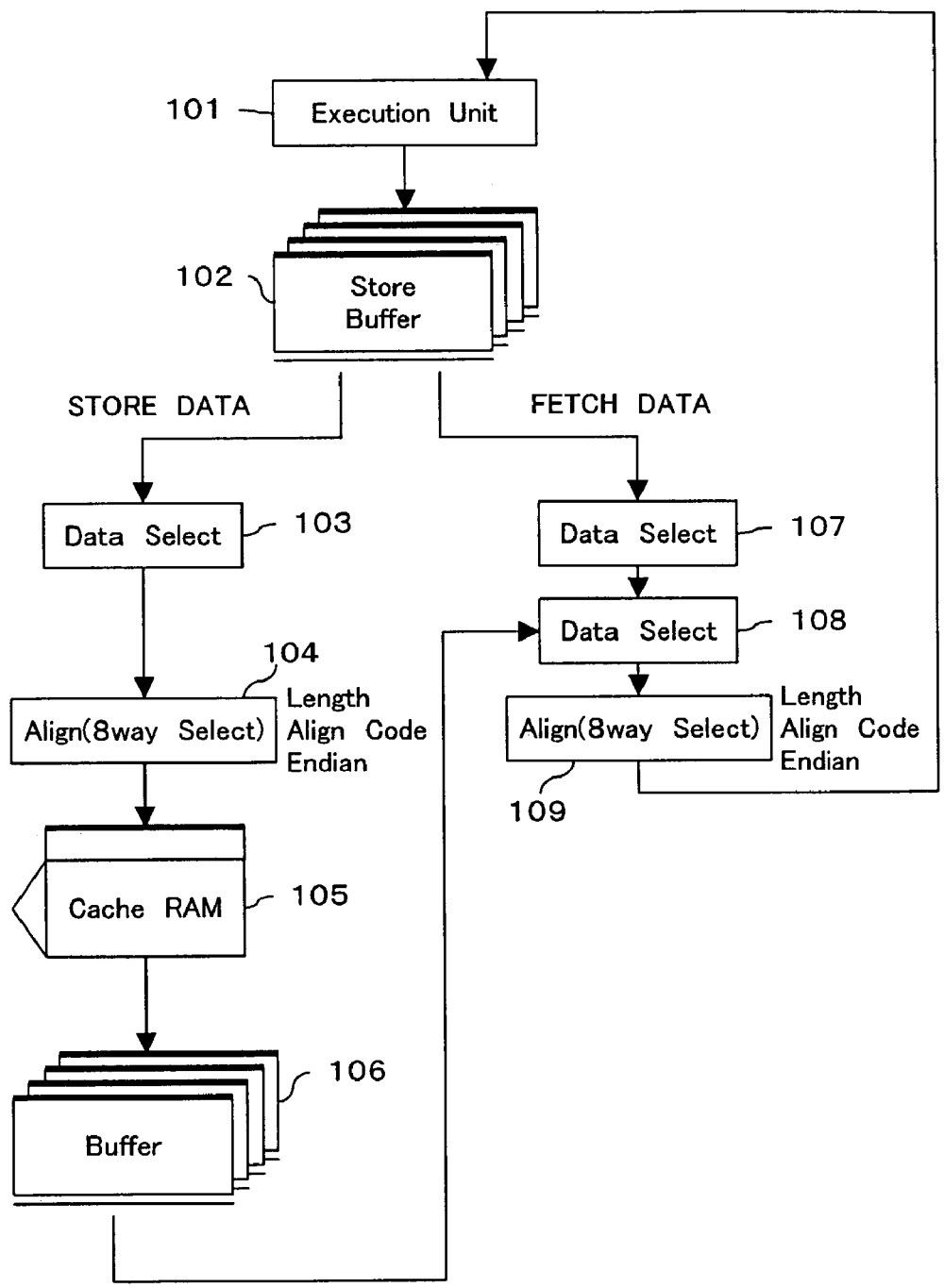
FIG. 1 shows the configuration of the conventional data processing device.

The embodiments of the present invention are described below by referring to the attached drawings.

Described first is FIG. 2. FIG. 2 shows the configuration of the data processing device embodying the present invention. The units shown in FIG. 2 are an arithmetic unit 11, alignment circuits 12, 15, 17, and 21, a store buffer 13, data selectors 14, 19, and 20, cache memory 16, and a buffer 18. The data processing device shown in FIG. 2 supports both of the above-mentioned endians in accessing the cache memory 16. It is assumed that the word length of data in the data processing device is 8 bytes.

The arithmetic unit 11, store buffer 13, data selectors 14, 19, and 20, cache memory 16, and buffer 18 in the data processing device embodying the present invention shown in FIG. 2 are respectively similar to the arithmetic unit 101, store buffer 102, data selectors 103, 107, and 108, cache memory 105, and buffer 106 in the conventional data processing device shown in FIG. 1.

The data processing device embodying the present invention shown in FIG. 2 is different from that shown in FIG. 1 in that: the alignment circuits 104 and 109 shown in FIG. 1 can select 8-way data while the alignment circuits 15 and 21 shown in FIG. 2 can select 2-way data; and the alignment circuits 12 and 17 capable of selecting 4-way data are provided between the arithmetic unit 11 and the store buffer 13, and between the data selector 20 and the arithmetic unit 11.

In the alignment circuits 12 and 17, stored data is realigned in a byte unit according to the store length indicating the word length of data, and the alignment code indicating whether data is stored right-adjusted or left-adjusted. The store length can be any of 1, 2, 4, and 8 bytes.

In the alignment circuits 15 and 21, data is realigned in the above-mentioned endians.

With the configuration shown in FIG. 2, the characteristic two alignment circuits, that is, the alignment circuits 12 and 15 are further described below.

As described above, it is not determined which endian is used in aligning data when the data is stored in cache memory until a retrieval result from a TLB is obtained. However, with the configuration shown in FIG. 2, it does not count because data is realigned by setting and specifying an endian not by the alignment circuit 12, but by the alignment circuit 15 provided between the data selector 14 which selects and reads the data stored in the store buffer 13 and the cache memory 16 storing the read data.

On the other hand, since stored data is realigned according to the store length and the alignment code by the 4-way alignment circuit 12 provided between the arithmetic unit 11 and the store buffer 13, the alignment circuit 15 located immediately before the cache memory 16 can be a 2-way realignment circuit capable of realigning data by setting and specifying an endian. As a result, the circuit configuration can be simplified, the circuit can be scaled down, and the delay caused by the data passing through the circuit can be reduced.

Described below are the operation of the alignment circuits 12 and 15.

Figure 3:
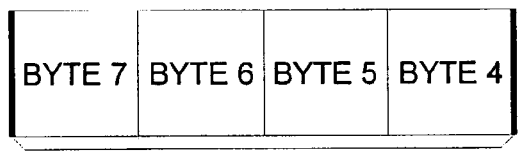
FIG. 3 shows the data copy obtained in an alignment circuit 12.
Figure 3:
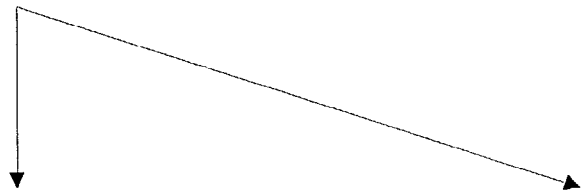
Figure 3:
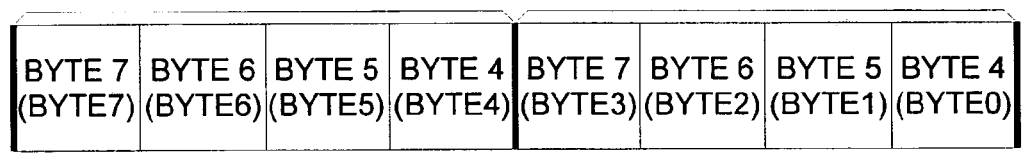
Figure 3:

Described first is FIG. 3. FIG. 3 shows the alignment circuit 12 copying data, and an example of the case in which the store length is 4 bytes, and the alignment code indicates left-adjusted data. In this case, the data obtained by the arithmetic unit 11 is located in each of the seventh, sixth, fifth, and fourth byte positions.

In this case, the alignment circuit 12 not only locates the data as is in each byte position of the seventh byte through fourth byte in the data to be stored (store data) obtained by the arithmetic unit 11, but also copies the data and locates the data in the byte position of the seventh byte in the byte position of the third byte, and stores the data in the store buffer 13. Similarly, the data in the sixth byte position is stored in the second byte position, the data in the fifth byte position is stored in the first byte position, and the data in the fourth byte position is stored in the 0-th byte position after copying and locating each piece of data and storing the data in the store buffer 13.

Described below are FIGS. 4A, 4B, 4C, and 4D. These figures show the process of realigning data performed in the alignment circuit 12 when the alignment code indicates left adjust.

Figure 4A:
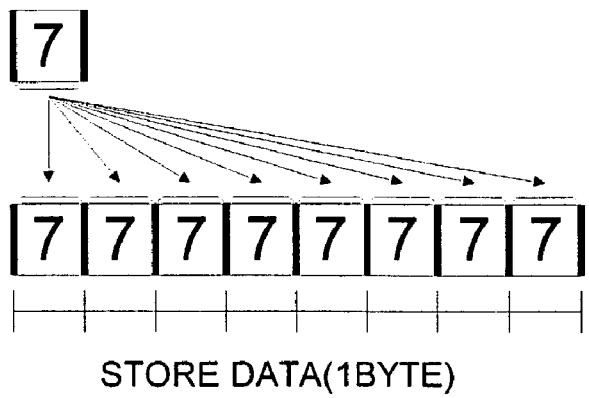
FIG. 4A shows the process of realigning data performed by the alignment circuit 12 when an alignment code is left-adjusted and store data is 1 byte.

FIG. 4A shows the process of realigning data when the store length indicates 1 byte. At this time, the data in the seventh byte position is copied and located in all byte positions from the seventh byte position to the 0-th byte position.

Figure 4B:
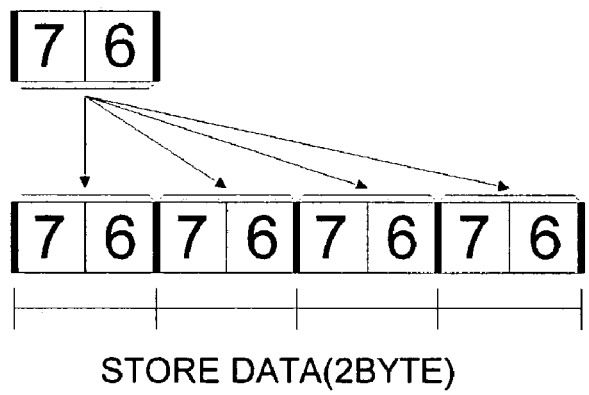
FIG. 4B shows the process of realigning data performed by the alignment circuit 12 when an alignment code is left-adjusted and store data is 2 bytes.

FIG. 4B shows the process of realigning data when the store length indicates 2 bytes. At this time, the data in the seventh byte position is copied and located in each of the seventh, fifth, third, and first byte positions, and the data in the sixth byte position is copied and located in each of the sixth, fourth, second, and 0-th byte positions.

Figure 4C:
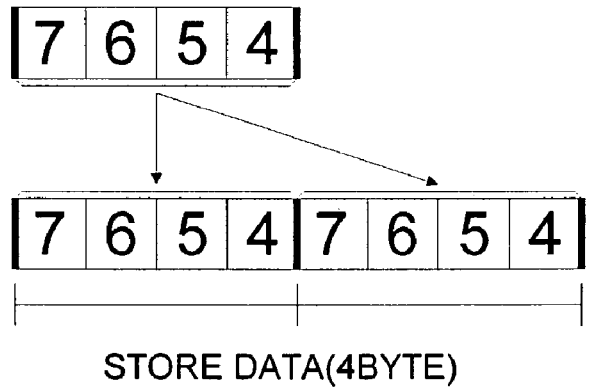
FIG. 4C shows the process of realigning data performed by the alignment circuit 12 when an alignment code is left-adjusted and store data is 4 bytes.

FIG. 4C shows the process of realigning data when the store length indicates 4 bytes. The process is the same as that shown in FIG. 3. At this time, the data in the seventh byte position is copied and located in the seventh and third byte positions, the data in the sixth byte position is copied and located in the sixth and second byte positions, the data in the fifth byte position is copied and located in the fifth and first byte positions, and the data in the fourth byte position is copied and located in the fourth and 0-th byte positions.

Figure 4D:
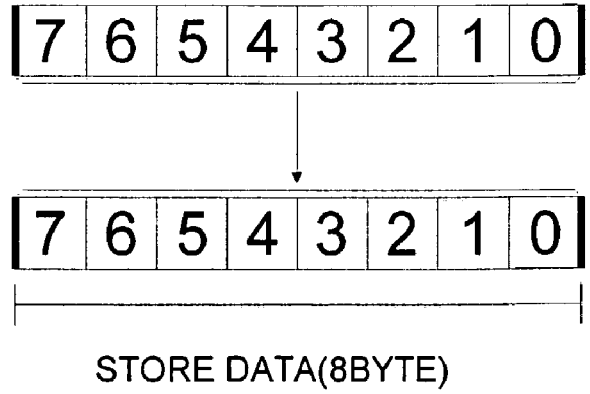
FIG. 4D shows the process of realigning data performed by the alignment circuit 12 when an alignment code is left-adjusted and store data is 8 bytes.

FIG. 4D shows the process of realigning data when the store length indicates 8 bytes. At this time, the data in each of the seventh through 0-th byte positions is located as is in each of the one-to-one corresponding seventh through 0-th byte positions.

Described below are FIGS. 5A, 5B, 5C, and 5D. These figures show the process of realigning data performed in the alignment circuit 12 when the alignment code indicates right adjust.

FIG. 5A shows the process of realigning data when the store length indicates 1 byte. At this time, the data in the seventh byte position is copied and located in all byte positions from the seventh byte position to the 0-th byte position.

FIG. 5B shows the process of realigning data when the store length indicates 2 bytes. At this time, the data in the first byte position is copied and located in each of the seventh, fifth, third, and first byte positions, and the data in the 0-th byte position is copied and located in each of the sixth, fourth, second, and 0-th byte positions.

FIG. 5C shows the process of realigning data when the store length indicates 4 bytes. At this time, the data in the third byte position is copied and located in the seventh and third byte positions, the data in the second byte position is copied and located in the sixth and second byte positions, the data in the first byte position is copied and located in the fifth and first byte positions, and the data in the 0-th byte position is copied and located in the fourth and 0-th byte positions.

FIG. 5D shows the process of realigning data when the store length indicates 8 bytes. At this time, the data in each of the seventh through 0-th byte positions is located as is in each of the one-to-one corresponding seventh through 0-th byte positions.

Figure 6:
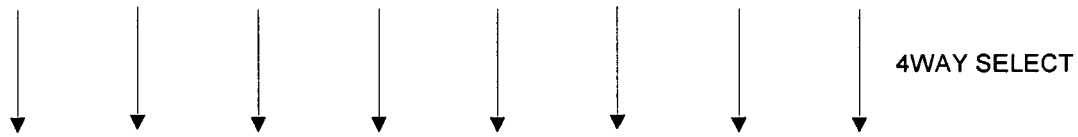
FIG. 6 shows the correspondence between the input byte position and the output byte position in the realignment performed by the alignment circuit 12.

Described below is FIG. 6. FIG. 6 shows the correspondence between the input byte position and the output byte position in a realigning process by the alignment circuit 12.

In the above-mentioned processes in FIGS. 4A, 4B, 4C, 4D, 5A, 5B, 5C, and 5D, for example, the byte position of data to be located in the seventh byte position after a realigning process is located before the realigning process in the 0-th byte position (FIG. 5A), the first byte position (FIG. 5B), the third byte position (FIG. 5C), and the seventh byte position (FIGS. 5D, 4A, 4B, 4C, and 4D). That is, in the realigning process by the alignment circuit 12, it is only necessary that, in locating the data located in the seventh byte position, one of the data located in each of the 0-th, first, third, and seventh data positions can be selected and located according to the store length and the alignment code.

FIG. 6 shows the summary of the results of the above-mentioned processes obtained for each output byte position. For example, in the leftmost column, in the store data obtained by the arithmetic unit 11, the function of selecting any of the data located in each of the 0-th, first, third, and seventh byte positions and storing the selected data in the seventh byte position of the store buffer 13 is shown. This corresponds to the check result of the byte position of the data before a realigning process which is to be located in the seventh byte position.

Another column shown in FIG. 6 is also described below. In FIG. 6, in the second column from the left, the function of selecting any of the data located in each of the positions of the four pieces of data, that is, the 0-th, second, sixth, and seventh byte positions, and storing the selected data in the sixth byte position of the store buffer 13 is shown. In FIGS. 4A, 4B, 4C, 4D, 5Q, 5B, 5C, and 5D, the byte position of data to be located in the sixth byte position after a realigning process is located before the realigning process in the 0-th byte position (FIGS. 5A and 5B), the second byte position (FIG. 5C), the sixth byte position (FIGS. 5D, 4B, 4C, and 4D), and the seventh byte position (FIG. 4A). The check result meets the correspondence shown in FIG. 6.

Thus, using the data which can be selected from the four input byte positions for each output byte position in the alignment circuit 12, that is, using the 4-way data, the function satisfying the correspondence between the input byte position and the output byte position in the realignment in the alignment circuit 12 shown in FIG. 6 can be assigned to the alignment circuit 12, and the alignment circuit 12 can perform the above-mentioned data copying operation and the data realigning operation based on the store length and the alignment code.

The alignment circuit 17 can also be assigned the function similar to the above-mentioned function of the alignment circuit 12.

Described below is the alignment circuit 15.

FIGS. 7A and 7B show the data realigning process depending on the specification of an endian by the alignment circuit 15. In the example shown in FIGS. 7A and 7B, when the data shown in FIG. 4C realigned by the alignment circuit 12, and stored in the store buffer 13, that is, the data realigned by the alignment circuit 12 when the store length is 4 bytes and the alignment code indicates left adjust, and stored n the store buffer 13, is input into the alignment circuit 15, the data is realigned.

FIG. 7A shows the process of realigning data when a big endian is indicated. At this time, the data in each of the seventh through 0-th byte positions is located as is in each of the one-to-one corresponding seventh through 0-th byte positions. Therefore, back to the position of each piece of data of the store data obtained by the arithmetic unit 11, the data in the seventh byte position in the store data is located in the seventh and third byte positions, the data in the sixth byte position in the store data is located in the sixth and second byte positions, the data in the fifth byte position in the store data is located in the fifth and first byte positions, and the data in the fourth byte position in the store data is located in the fourth and 0-th byte positions, and are stored in the cache memory 16 which functions as the cache memory in the data processing device shown in FIG. 2 and whose storage capacity is larger than the store buffer 13.

FIG. 7B shows the process of realigning data when a little endian is indicated. At this time, the data in each of the seventh through 0-th byte positions is located in the inverse positions, that is, in the 0-th through seventh byte positions. This realigning process is also referred to as a 'cross-alignment'. Therefore, back to the position of each piece of data of the store data obtained by the arithmetic unit 11, the data in the seventh byte position in the store data is located in the fourth and 0-th byte positions, the data in the sixth byte position in the store data is located in the fifth and first byte positions, the data in the fifth byte position in the store data is located in the sixth and second byte positions, and the data in the fourth byte position in the store data is located in the seventh and third byte positions, and are stored in the cache memory 16.

Described below are the processes in FIGS. 8A, 8B, 8C, and 8D. These figures show the realigning process performed by the alignment circuit 15 on the data realigned by the alignment circuit 12 when an alignment code indicates left adjust.

FIG. 8A shows the realigning process performed on the data realigned by the alignment circuit 12 when the store length is 1 byte. If the big endian is specified, the data in each of the seventh through 0-th byte positions is located as is in each of the one-to-one corresponding seventh through 0-th byte positions. If the little endian is specified, the data in each of the seventh through 0-th byte positions is cross-aligned and located in each of the 0-th through seventh byte positions.

The above-mentioned processes hold true with the realigning process performed on the data realigned by the alignment circuit 12 when the store length shown in FIG. 8B indicates 2 bytes, the realigning process performed on the data realigned by the alignment circuit 12 when the store length shown in FIG. 8C indicates 4 bytes, and the realigning process performed on the data realigned by the alignment circuit 12 when the store length shown in FIG. 8C indicates 8 bytes. That is, if the big endian is specified, the data in each of the seventh through 0-th byte positions is located as is in each of the one-to-one corresponding seventh through 0-th byte positions, and if the little endian is specified, then the data in each of the seventh through 0-th byte positions is cross-aligned and located in each of the 0-th through seventh byte positions.

Described below are the processes shown in FIGS. 9A, 9B, 9C, and 9D. These figures show the realigning processes performed by the alignment circuit 15 on the data realigned by the alignment circuit 12 when the alignment code indicates right adjust.

Each of the cases shown in FIGS. 9A, 9B, 9C, and 9D is similar to those shown in FIGS. 8A, 8B, 8C, and 8D. That is, in any of the realigning process performed on the data realigned by the alignment circuit 12 when the store length shown in FIG. 9A indicates 1 bytes, the realigning process performed on the data realigned by the alignment circuit 12 when the store length shown in FIG. 9B indicates 2 bytes, the realigning process performed on the data realigned by the alignment circuit 12 when the store length shown in FIG. 9C indicates 4 bytes, and the realigning process performed on the data realigned by the alignment circuit 12 when the store length shown in FIG. 9D indicates 8 bytes, if the big endian is specified, then the data in each of the seventh through 0-th byte positions is located as is in each of the one-to-one corresponding seventh through 0-th byte positions, and if the little endian is specified, then the data in each of the seventh through 0-th byte positions is cross-aligned and located in each of the 0-th through seventh byte positions.

Thus, in the alignment circuit 15, if the big endian is specified, then the data in each input byte position is located as is for each output byte position, and if the little endian is specified, then the data in each input byte position is cross-aligned and located for each output byte position. That is, since the 2-way data of a simple circuit configuration can be used, the transmission delay in the alignment circuit 15 can be reduced as compared with the conventional cases in which the 8-way alignment circuit is used.

Since the relationship between input and output of the alignment circuit 15 indicates desired symmetry regardless of the realignment performed by the alignment circuit 12, it is easy to reduce the variations in transmission delay in the alignment circuit 15 for each output byte position. The realignment with the desired symmetry in the alignment circuit 15 can be realized by the copy of data based on the above-mentioned store length performed by the alignment circuit 12.

Using the alignment circuit 12 and the alignment circuit 15 performing the above-mentioned operations, the requirement for the delay time allowed at a timing of a write to the cache memory 16 and the requirement for the variations in delay time among simultaneously written data can be more easily satisfied than in the conventional technology using 8-way data alignment circuit.

If the alignment circuit 17 includes the same function as the alignment circuit 12, and if the alignment circuit 21 includes the same function as the alignment circuit 15 for the 2-way data, that is, as shown in FIGS. 10A and 10B, if the big endian is specified, then the data in each input byte position is located as is for each output byte position (FIG. 10A), and if the little endian is specified, then data in each input byte position is cross-aligned and located for each output byte position (FIG. 10B) in the data realigning process.

Furthermore, the present invention can perform various improving and amending processes without limiting to the above-mentioned embodiments.

As described above in detail, the present invention realigns the data output as a result of an arithmetic from an arithmetic unit, provided in a data processing device, for performing an arithmetic operation at an instruction, the data being stored in the first storage unit, and realigns the data read from the first storage unit and stored in the second storage unit functioning as cache memory in the data processing device.

Thus, according to the present invention, the amount of work for realigning the data stored in the second storage unit can be reduced, thereby simplifying the circuit configuration for realigning the data, and easily satisfying the requirement by the cache memory for the transmission delay of the data.

What is claimed is:

1. A data processing device, comprising:
   an arithmetic unit performing an arithmetic operation on an instruction and outputting data obtained as a result of the arithmetic operation;
   a first storage unit storing data output from said arithmetic unit;
   a second storage unit functioning as cache memory storing the data read from said first storage unit;
   a first data alignment unit realigning data output from said arithmetic unit before the data is stored in said first storage unit; and
   a second data alignment unit realigning the data read by said first storage unit before the data is stored in said second storage unit.

2. The data processing device according to claim 1, wherein
   said second data alignment unit can be configured such that data can be realigned according to information in an instruction specifying an endian when the data is stored in said second storage unit.

3. The data processing device according to claim 1, wherein
   said first data alignment unit can be configured such that the data can be realigned according to word length information about a word length of the data when the data is stored in said first storage unit, and location information about a position of the data in a storage area in said first storage unit in which the data is located when the data is stored in said first storage unit.

4. The data processing device according to claim 3, wherein:
   said second data alignment unit can be configured such that data can be realigned according to information in an instruction specifying an endian when the data is stored in said second storage unit; and
   said first data alignment unit can be configured such that the data can be copied and located in a position where original data is not located in the storage area.

5. The data processing device according to claim 1, further comprising:
   a third storage unit storing data read from said second storage unit;
   a third data alignment unit realigning data read from said second storage unit and stored in said third storage unit; and
   a fourth data alignment unit realigning data read from said third storage unit to use the data in an arithmetic operation performed by said arithmetic unit.

6. The data processing device according to claim 5, wherein
   said fourth data alignment unit can realign data according to information in an instruction specifying an endian when the data is stored in said second storage unit.

7. The data processing device according to claim 5, wherein
   said third data alignment unit can realign data according to word length information about a word length of the data when the data is stored in said first storage unit, and location information about a position of the data in a storage area in said first storage unit in which the data is located when the data is stored in said first storage unit.

8. The data processing device according to claim 5, wherein
   said fourth data alignment unit can also be configured such that data read from said arithmetic unit can be realigned as an arithmetic target of said arithmetic unit.

9. A data processing device, comprising:
   arithmetic means for performing an arithmetic operation on an instruction and outputting data obtained as a result of the arithmetic operation;
   first storage means for storing data output from said arithmetic means;
   second storage means for functioning as cache memory storing the data read from said first storage means;
   first data alignment means for realigning data output from said arithmetic means before the data is stored in said first storage means; and
   second data alignment means for realigning the data read by said first storage means before the data is stored in said second storage means.

10. A method for aligning stored data for use with a data processing device, comprising:
    realigning data, which is output as a result of an arithmetic operation from an arithmetic unit provided in the data processing device for performing an arithmetic operation on an instruction, before the data is stored in a first storage unit; and
    realigning data read from the first storage unit before the data is stored in a second storage unit functioning as cache memory in the data processing device.

11. The method according to claim 10, wherein:
    when data stored in said second storage unit is realigned, the data is realigned according to information in an instruction specifying an endian when the data is stored in said second storage unit; and
    when data stored in said first storage unit is realigned, the data is realigned according to word length information, which shows a word length of the data when the data is stored in said first storage unit, and location information, which shows a position of the data in a storage area in said first in which the data is located when the data in said first storage unit, and the data can be copied to a position in which original data is not located in the storage area according to the word length information and the location information.

* * * * *